US010696035B2

(12) United States Patent
Bostick et al.

(10) Patent No.: US 10,696,035 B2
(45) Date of Patent: Jun. 30, 2020

(54) MULTI-DRONE BASED THREE-DIMENSIONAL PRINTING

(71) Applicant: International Business Machines Corporation, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/374,038

(22) Filed: Apr. 3, 2019

(65) Prior Publication Data

US 2019/0224956 A1 Jul. 25, 2019

Related U.S. Application Data

(63) Continuation of application No. 14/989,296, filed on Jan. 6, 2016, now Pat. No. 10,343,387.

(51) Int. Cl.
*B64C 39/02* (2006.01)
*B33Y 10/00* (2015.01)
(Continued)

(52) U.S. Cl.
CPC ............ *B33Y 10/00* (2014.12); *B29C 64/112* (2017.08); *B29C 64/20* (2017.08); *B33Y 30/00* (2014.12); *B29L 2009/00* (2013.01)

(58) Field of Classification Search
CPC .......... G06N 5/02; B33Y 10/00; B33Y 30/00; B29C 64/20; B29C 64/112
See application file for complete search history.

(56) References Cited

U.S. PATENT DOCUMENTS 7,291,002 B2   11/2007  Russell et al.
9,815,078 B2   11/2017  Neustadt
(Continued)

FOREIGN PATENT DOCUMENTS

WO    2015/073322 A1    5/2015

OTHER PUBLICATIONS

Colin Smith, "Nest building, 3D printing aerial robots developed by researchers", Imperial College, London, http://www3.imperial.ac.uk/newsandeventspggrp/imperialcolege/newssummary/news_8-5-2014-14-37-52, Dated May 8, 2014, 2 pages.

(Continued)

*Primary Examiner* — Galen H Hauth
(74) *Attorney, Agent, or Firm* — Jay Wahlquist; Madeline F. Schiesser; Keohane & D'Alessandro PLLC

(57) ABSTRACT

Approaches presented herein enable forming a 3D object with a plurality of unmanned aerial vehicles (UAV), also known as "drones", configured to carry and deposit 3D printing material, and to fly to a depositing location (e.g., fly, hover, or land) to print a 3D object. Specifically, at a central controller, a set of specifications for a 3D object to be printed are obtained. The central controller directs each of a plurality of UAVs controlled by the central controller to fly to a depositing location where a layer of 3D printer material is to be deposited, the location determined from the set of specifications. In response to a UAV of the plurality reaching the depositing location, the central controller further directs the UAV of the plurality to apply the layer of 3D printer material to the depositing location.

8 Claims, 8 Drawing Sheets

(51) Int. Cl.
*B33Y 30/00* (2015.01)
*B29C 64/112* (2017.01)
*B29C 64/20* (2017.01)
*B29L 9/00* (2006.01)

(56) References Cited

U.S. PATENT DOCUMENTS

| | | | |
|---|---|---|---|
| 2004/0068415 | A1 | 4/2004 | Solomon |
| 2014/0032034 | A1 | 1/2014 | Raptopoulos et al. |
| 2014/0054817 | A1 | 2/2014 | Jaffe |
| 2014/0125767 | A1 | 5/2014 | Bell et al. |
| 2015/0142211 | A1 | 5/2015 | Shehata et al. |
| 2016/0364989 | A1 | 12/2016 | Speasl et al. |
| 2018/0134387 | A1 | 5/2018 | Kovac et al. |

OTHER PUBLICATIONS

Wikipedia, "3D printing", Jun. 11, 2015, 33 pages.
Stratasys, 3D Printing Materials, "Explore the widest range of materials in the 3D printing world", http://www.stratasys.com/materials.aspx, Stratasys Ltd. Copyright 2015, 2 pages.
Shapeways, 3D Printing Materials: Plastic, Metal, Ceramics and More—Shapeways, "Plated, Polished, Perfection", http://www.shapeways.com/materials/, Jun. 11, 2015, 4 pages.
Solo, "Rethink What a Drone Can Do. We Did.", http://3drobotics.com/, Copyright 2015, Drone (solo) & UAV Technology, 5 pages.
Baguley, Richard, "Best 3D Printers 2016", Tom's Guide, 2016, http://www.tomsguide.com/us/best-3d-printers, review-2236.html, 5 pages.
RT, "Navy considers 3D-printing future fleets of drones", http://rt.com/usa/3d-navy-drones-printers-9601, Published May 29, 2013, 3 pages.
Richard Baguley, tom'sGUIDE, Tech for Real Life, "Printrbot Simple Metal Review: 3D Printing on the Cheap", http://www.tomsguide.com/us/printrbot-simple-metal-3d-printer,review . . . , Jul. 8, 2014, 7 pages.
Wikipedia, "Unmanned aerial vehicle", http://en.wikipedia.org/wiki/Unmanned_aerial_vehicle, Jun. 11, 2015, 31 pages.
Frederic Lardinois, TC News Video Events Crunchbase, "Talking Drones With 3D Robotics CEO Chris Anderson", Jan. 11, 2015, 4 pages.
Hauth, Galen H., U.S. Appl. No. 14/989,296, Office Action dated Aug. 9, 2018, 15 pgs.
Hunt et al., "3D Printing with Flying Robots", 2014 IEEE International Conference on Robotics & Automation (ICRA), May 31-Jun. 7, 2014 Hong Kong, China, p. 4493-4499, 2014.
Hauth, Galen H., U.S. Appl. No. 14/989,296, Notice of Allowance dated Feb. 25, 2019, 9 pgs.

MULTI-DRONE BASED THREE-DIMENSIONAL PRINTING

RELATED APPLICATION

The present patent document is a continuation of U.S. patent application Ser. No. 14/989,296, filed Jan. 6, 2016, entitled "MULTI-DRONE BASED THREE-DIMENSIONAL PRINTING", the entire contents of which is incorporated herein by reference.

TECHNICAL FIELD

This invention relates generally to three-dimensional (3D) printing and, more specifically, to centralized control of a plurality of drones for 3D printing of an object.

BACKGROUND

Three-dimensional (3D) printing is a process that can be used to make a 3D object. The 3D object may be based on a 3D model, such as a physical model or a virtual representation of a 3D model or object. The 3D object is usually printed using an additive process in which successive layers of material are laid down as either liquid or particle form by a controlling computer and instrumentation. For example, a 3D printer may deposit one or more thin layers of raw material, and a print of a 3D object gradually materializes as the layers are built up step by step. The amount of detail possible in a 3D print may be determined, among other things, by the thinness of the layers. A wide variety of types of raw materials may be employed to print a 3D object, such as synthetic resin, ceramic powder, metal, or even glass.

In general, the size and shape of 3D printers vary by manufacturer, intended purpose, and financial cost. Typically, 3D printers are self-contained devices used to create an object within a defined space of the 3D printer. Because of this limitation, smaller objects are generally created with a 3D printer, while larger objects are constructed outside of a 3D printer, using multiple smaller parts. As a result, in order to create a large 3D printed object, a sufficiently large 3D printer must currently be obtained and/or assembled in situ to print the entirety of the large object. Otherwise, the large object must be assembled piece-wise from smaller 3D printed objects. Very large 3D printers are generally bulky, cost-prohibitive, and inefficient or slow. Furthermore, a piece-wise assembled object introduces the risk of pieces failing to fit together due to variations during manufacturing or assembly, resulting in a weakened structure. Furthermore, an assembled structure must either be transported to a final site or built piece by piece at a final site.

In a separate technological area, an unmanned aerial vehicle (UAV), commonly known as a drone, can be defined as an aircraft without a human pilot aboard. Its flight is generally controlled either autonomously by onboard computers or by the remote control of a pilot on the ground or in another vehicle. Typical launch and recovery of a drone is usually by an automatic system or an external operator on the ground. The International Civil Aviation Organization (ICAO) broadly classifies drones into two categories: autonomous aircraft and remotely piloted aircraft. In general, drones vary in size and design depending, among other things, on an intended purpose of the drone. For example, some drones have military and special operation applications, while others are used in civil applications, such as policing and firefighting, and nonmilitary security work, such as inspection of power or pipelines, and still others are used for recreational purposes, among other purposes. To this extent, drones may be equipped with cameras and other tools for carrying out a specific application.

WIPO International Patent Application WO/2015/073322 discloses: "A robotic 3D printing system [that] has a six degree of freedom (DOF) robot that holds [a] platform on which [a] 3D part is built on. The system uses the dexterity of the 6 DOF robot to move and rotate the platform relative to [a] 3D printing head, which deposits the material on the platform. The system allows the part build in 3D directly with a simple printing head and depositing the material along the gravity direction. The 3D printing head is held by another robot or robots. The robot movement can be calibrated to improve the accuracy and efficiency for high precision 3D part printing."

U.S. Patent Application 2014/0054817 discloses: "a 3-dimensional (3D) printing device with a column, a climber attached to the column, and a beam attached to the climber such that the rectangular beam can angularly rotate with respect to the column." U.S. Patent Application 20140054817 further discloses in some embodiments that "a plurality of 3D printing devices may be networked together."

U.S. Pat. No. 7,291,002 discloses: "sensors . . . used to monitor and control . . . functions, such as running diagnostic tests, performing cleaning of . . . printheads, refilling [a] build material dispenser assembly, cleaning [a] spreader assembly . . . ."

U.S. Patent Application 2014/0125767 discloses: "the use of a three-dimensional capture device that captures a plurality of three-dimensional images of an environment" to "build[ ] a three-dimensional composite scene." U.S. Patent Application 20140125767 further discloses that "possible implementations include, but are by no means limited to . . . 3D capture hardware . . . mounted to an aerial drone such as a quadcopter".

U.S. Patent Application 2014/0032034 discloses: "a delivery system having unmanned aerial delivery vehicles and a logistics network for control and monitoring. In certain embodiments, a ground station provides a location for interfacing between the delivery vehicles, packages carried by the vehicles and users. In certain embodiments, the delivery vehicles autonomously navigate from one ground station to another. In certain embodiments, the ground stations provide navigational aids that help the delivery vehicles locate the position of the ground station with increased accuracy."

U.S. Patent Application 2004/0068415 discloses: "a multirobotic system comprised of automated mobile robotic vehicles (MRVs)". "[A] network of MRV drones provides sensor information to a lead MRV, which calculates the distance to objects in the environment. By using a method of optic flow to map coordinates in spatial positions, MRVs establish mission priorities and work as a group to accomplish a mission."

SUMMARY

In general, embodiments described herein provide for forming a 3D object with a plurality of unmanned aerial vehicles (UAV), also known as "drones", configured to carry and deposit 3D printing material, and to fly to a depositing location (e.g., fly, hover, or land) to print a 3D object. Specifically, at a central controller, a set of specifications for a 3D object to be printed are obtained. The central controller directs each of a plurality of UVAs controlled by the central controller to fly to a depositing location where a layer of 3D printer material is to be deposited, the location determined from the set of specifications. In response to a UAV of the plurality reaching the depositing location, the central controller further directs the UAV of the plurality to apply the layer of 3D printer material to the depositing location.

One aspect of the present invention includes a method for forming a three-dimensional (3D) object. The method comprises obtaining, at a central controller, a set of specifications for the 3D object. The method further comprises directing, by the central controller, each unmanned aerial vehicle (UAV) of a plurality of UAVs controlled by the central controller to fly to a depositing location determined from the set of specifications upon which a layer of 3D printer material is to be deposited. The method also comprises directing, by the central controller, in response to an indication that a UAV of the plurality of UAVs has reached the depositing location, the UAV to apply the layer of 3D printer material to the depositing location. This method offers several advantages, such as, but not limited to, coordinated printing of a 3D object by a plurality of UAVs.

The method may optionally further comprise monitoring at least one of an energy level and a printer material level of each UAV of the plurality of UAVs. Further, the method may comprise detecting, based on the monitoring, the at least one of an energy level and a printer material level below a predetermined threshold for at least one UAV of the plurality of UAVs. The method may also comprise releasing a replacement UAV to a location of the at least one UAV of the plurality of UAVs and reassigning a printing mission of the at least one UAV of the plurality of UAVs to the replacement UAV. This method offers several advantages, such as, but not limited to, coordinated printing of a 3D object and replacement of depleted UAVs by new UAVs for unbroken completion of a printing mission.

The method may optionally further comprise calculating a release time of the replacement UAV to optimize a hand-off from the at least one UAV of the plurality of UAVs to the replacement UAV. This, for example, allows a replacement of an old UAV with a new UAV to be timed such that no resources are wasted during a printing mission.

The method of monitoring an energy level of each of the plurality of UAVs may optionally further comprise calculating a remaining energy life based on at least one of: an energy level, a rate of energy consumption, an energy requirement to return to a staging area, a UAV weight, and a UAV performance. The method of monitoring a printer material level of each of the plurality of UAVs may optionally further comprise calculating a remaining printer material supply life based on at least one of: a printer material level, a rate of printer material consumption, and a performance. This offers, for example, an advantage of determining in advance when a printer UAV is likely to reach a minimum threshold and be eligible for replacement.

The method may optionally further comprise calculating, by the central controller, a coordinated flight path for each UAV of the plurality of UAVs and assigning each UAV of the plurality of UAVs a set of printing instructions comprising the coordinated flight path. This technique enables, for example, a plurality of printer UAVs to act in unison to print a 3D object.

The method may optionally further comprise receiving an image of the 3D object from a UAV comprising an optical sensor. This method may further comprise determining if at least one of a structure parameter, a strength parameter, and a progress parameter of the 3D object is outside of a predetermined threshold based on the image. This method may further comprise modifying a printing mission of a UAV of the plurality of UAVs in the case that the at least one of a structure parameter, a strength parameter, and a progress parameter of the 3D object is outside of the predetermined threshold. This technique permits, for example, an active printing of a 3D object to be adjusted and printing instructions distributed to a plurality of printer UAVs to be modified in order to, for example, correct defects or variations in a 3D printed object.

The method may optionally further comprise each of the plurality of UAVs configured to at least one of: hover and deposit a layer of 3D printer material, land and deposit a layer of 3D printer material, and fly and insert a printed 3D part into the 3D object. These techniques enable, for example, a plurality of coordinated UAVs to perform a variety of printing tasks.

The method may optionally further comprise communicating between the central controller and the plurality of UAVs over a network. This technique permits, for example, synchronized networked control of a plurality of drones.

Another aspect of the present invention includes a computer system for forming a three-dimensional (3D) object, the computer system comprising: a plurality of unmanned aerial vehicles (UAVs), each UAV of the plurality of UAVs having a propulsion apparatus, a communication apparatus, and a 3D printer material depositing apparatus. The computer system further comprises a central controller, comprising: a memory medium comprising program instructions; a bus coupled to the memory medium; and a processor for executing the program instructions comprising a printing control tool. The instructions cause the system to obtain, at the central controller, a set of specifications for the 3D object. The instructions cause the system to direct, by the central controller, each UAV of a plurality of UAVs controlled by the central controller to fly to a depositing location determined from the set of specifications upon which a layer of 3D printer material is to be deposited. Further, the instructions cause the system to direct, by the central controller, in response to an indication that a UAV of the plurality of UAVs has reached the depositing location, the UAV to apply the layer of 3D printer material to the depositing location.

Yet another aspect of the present invention includes a computer program product for forming a three-dimensional (3D) object. The computer program product comprises a computer readable storage device, and program instructions stored on the computer readable storage device, to obtain, at a central controller, a set of specifications for the 3D object. The computer readable storage device further comprises instructions to direct by the central controller, each unmanned aerial vehicle (UAV) of a plurality of UAVs controlled by the central controller to fly to a depositing location determined from the set of specifications upon which a layer of 3D printer material is to be deposited. Further, the computer readable storage device comprises instructions to direct, by the central controller, in response to an indication that a UAV of the plurality of UAVs has reached the depositing location, the UAV to apply the layer of 3D printer material to the depositing location.

Yet still another aspect of the present invention includes a method for forming a three-dimensional (3D) object, comprising: providing a computer infrastructure that includes at least one computer device. The computer device operates to perform the step of obtaining, at a central controller, a set of specifications for the 3D object. The computer device further operates to perform the step of directing, by the central controller, each unmanned aerial vehicle (UAV) of a plurality of UAVs controlled by the central controller to fly to a depositing location determined from the set of specifications upon which a layer of 3D printer material is to be deposited. Further, the computer device operates to perform the step of directing, by the central controller, in response to an indication that a UAV of the plurality of UAVs has reached the depositing location, the UAV to apply the layer of 3D printer material to the depositing location.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

Figure 1:
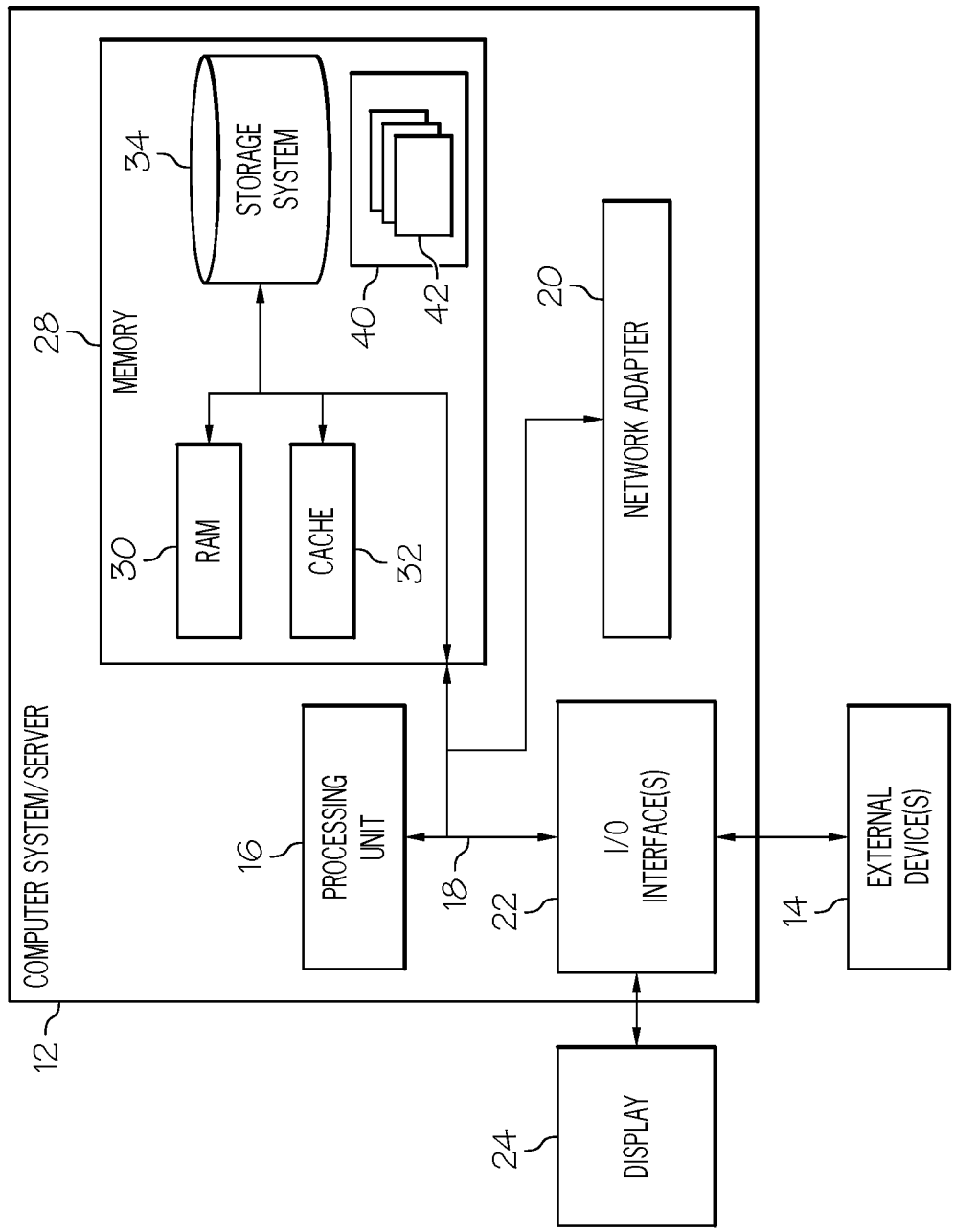
FIG. 1 shows an architecture in which the invention may be implemented according to illustrative embodiments.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Illustrative embodiments will now be described more fully herein with reference to the accompanying drawings, in which illustrative embodiments are shown. It will be appreciated that this disclosure may be embodied in many different forms and should not be construed as limited to the illustrative embodiments set forth herein. Rather, these embodiments are provided so that this disclosure will be thorough and complete and will fully convey the scope of this disclosure to those skilled in the art.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. Furthermore, similar elements in different figures may be assigned similar element numbers. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing," "detecting," "determining," "evaluating," "receiving," or the like, refer to the action and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission or viewing devices. The embodiments are not limited in this context.

As stated above, embodiments described herein provide for forming a 3D object with a plurality of unmanned aerial vehicles (UAV), hereinafter "drones", configured to carry and deposit 3D printing material, and to fly to a depositing location (e.g., fly, hover, or land) to print a 3D object. Specifically, at a central controller, a set of specifications for a 3D object to be printed are obtained. The central controller directs each of a plurality of drones controlled by the central controller to fly to a depositing location where a layer of 3D printer material is to be deposited, the location determined from the set of specifications. In response to a drone of the plurality reaching the depositing location, the central controller further directs the drone of the plurality to apply the layer of 3D printer material to the depositing location.

The inventors of the present invention have discovered several restrictions of current methods of 3D printing. More specifically, 3D printers are generally limited to the size of an object the 3D printer can print. Accordingly, under present solutions for creating large 3D printed objects, a 3D printer creates a set of smaller parts that can then be assembled into larger parts or structures. This assembled object is then moved to a final site, or pieces are transported to a final site and assembled on site. This technique necessitates that a larger 3D printed object be assembled piecewise and incurs the risk (for example due to manufacturing variations) that one or more pieces may not fit together as planned.

The approaches described herein contain numerous advantages over present methods including, but not limited to, the creation of 3D objects of any size on site through the use of multiple drones having 3D printing capabilities. Approaches further include centralized programmatic control of multiple drones comprising 3D printers, the drones carrying 3D printing materials and being enabled to fly to a depositing location (e.g., fly, hover, or land) and to print a 3D object of any size on premises. This centralized programmatic control offers, among other things, the advantages of continuous, on-site (e.g., an indoor warehouse or manufacturing facility, an outdoor location), whole-structure printing by monitoring energy/power and printing material levels of a plurality of drones and deploying new drones to replace exhausted drones. Furthermore, the approaches described herein for centralized control of drones may be programmable and repeatable at other locations, allowing for large custom jobs or optimization of a drone coordination program for repeat usage. Furthermore, in the approaches described herein, fresh 3D printing material may be shipped to a site for use by a plurality of drones to create an object instead of shipping a set of parts or an assembled object.

Referring now to FIG. 1, a computerized implementation 10 of an embodiment for forming a 3D object will be shown and described. Computerized implementation 10 is only one example of a suitable implementation and is not intended to suggest any limitation as to the scope of use or functionality of embodiments of the invention described herein. Regardless, computerized implementation 10 is capable of being implemented and/or performing any of the functionality set forth hereinabove.

In computerized implementation 10, there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

This is intended to demonstrate, among other things, that the present invention could be implemented within a network environment (e.g., the Internet, a wide area network (WAN), a local area network (LAN), a virtual private network (VPN), etc.), a cloud computing environment, a cellular network, or on a stand-alone computer system. Communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer system 12 is intended to demonstrate that some or all of the components of implementation 10 could be deployed, managed, serviced, etc., by a service provider who offers to implement, deploy, and/or perform the functions of the present invention for others.

Computer system 12 is intended to represent any type of computer system that may be implemented in deploying/realizing the teachings recited herein. Computer system 12 may be described in the general context of computer system executable instructions, such as program modules, being executed by a computer system. Generally, program modules may include routines, programs, objects, components, logic, data structures, and so on, that perform particular tasks or implement particular abstract data types. In this particular example, computer system 12 represents an illustrative system for forming a 3D object. It should be understood that any other computers implemented under the present invention may have different components/software, but can perform similar functions.

Computer system 12 in computerized implementation 10 is shown in the form of a general-purpose computing device. The components of computer system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Processing unit 16 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 16 collects and routes signals representing inputs and outputs between external devices 14 and input devices (not shown). The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 16 executes computer program code, such as program code for forming a 3D object, which is stored in memory 28, storage system 34, and/or program/utility 40. While executing computer program code, processing unit 16 can read and/or write data to/from memory 28, storage system 34, and program/utility 40.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media, (e.g., VCRs, DVRs, RAID arrays, USB hard drives, optical disk recorders, flash storage devices, and/or any other data processing and storage elements for storing and/or processing data). By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation. Memory 28 may also have an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
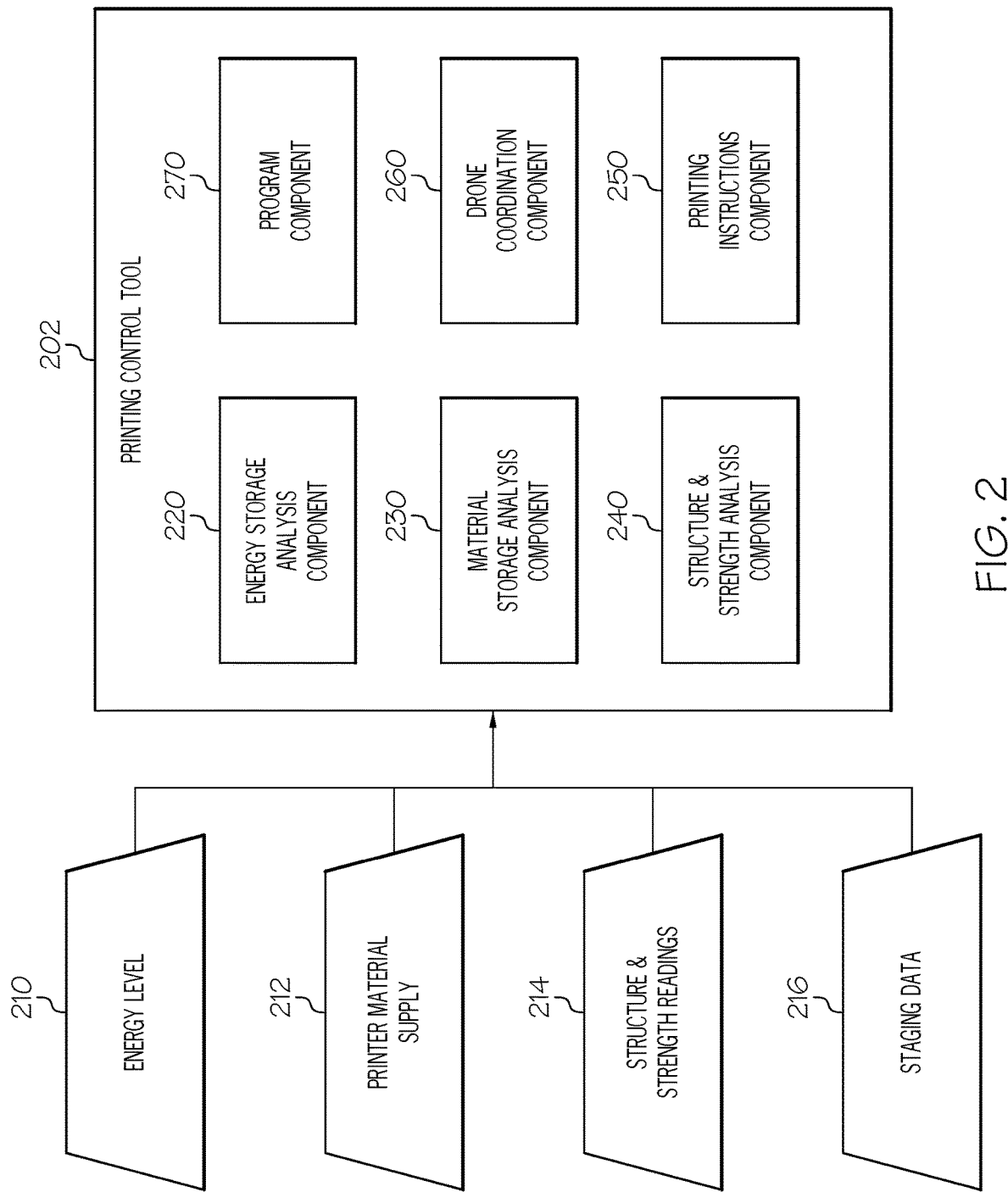
FIG. 2 shows a more detailed system architecture for forming a 3D object according to illustrative embodiments.

Referring now to FIG. 2, printing control tool 202, which receives and analyses data for forming a 3D object, will be described. As shown, printing control tool 202 receives status data such as energy level 210 of one or more drones, printer material supply 212 of one or more drones, structure and strength readings 214 of an object being printed from one or more observer drones, and staging data 216 describing a staging site for the one or more drones. Status data may also comprise task status factors associated with one or more drones, such as a location of a drone, an elevation of a drone, or a current stage of a task being performed (e.g., flying to, arriving at, or printing) by a drone.

In some embodiments, the status data may be periodically received by printing control tool 202 (e.g., once per minute), or may be pushed to printing control tool 202 (e.g., when a drone is nearing an energy or printing material minimum threshold), or may be pulled to printing control tool 202 (e.g., periodically, dynamically, randomly), or so forth.

Printing control tool 202 may comprise energy storage analysis component 220. Energy storage analysis component 220 may receive status data on energy level 210 of one or more drones and determine an energy expectancy of a plurality of drones and one or more observer drones. Energy storage analysis component 220 may consider, and energy level 210 may include, for example, a current energy level of a drone (e.g., a battery level or fuel level), a rate of energy consumption, an energy requirement to return to a staging area and distance to staging area, as well as other parameters such as drone weight, printing material weight, current flying conditions, and historic drone performance.

Printing control tool 202 may also comprise material storage analysis component 230. Material storage analysis component 230 may receive status data on printer material supply 212 of one or more drones and determine a printer material expectancy of a plurality of drones. Material storage analysis component 230 may consider, and printer material supply 212 may include, for example, a current printer material level of a drone (e.g., an amount of material in a storage tank), a rate of printer material consumption, as well as other parameters such as drone printing performance, printing material performance, and historic drone and printing material performance.

Printing control tool 202 may further comprise structure and strength analysis component 240 and printing instructions component 250. Structure and strength analysis component 240 may receive status data on structure and strength readings 214 of an object being printed from one or more observer drones and dynamically, periodically, etc., perform an analysis on the structure and strength readings to determine if a printed object being observed is within parameters or a threshold. In the event that a structure or strength of the printed object is outside of a parameter or a threshold, printing instructions component 250 may adjust a set of printing instructions of one or more drones to bring the printed object back within the parameter or threshold. Printing instructions component 250 may further comprise a set of specifications describing an object being printed.

Printing control tool 202 may further comprise drone coordination component 260. Drone coordination component 260 may receive input associated with a plurality of drone energy levels from energy storage analysis component 220, input associated with a plurality of drone printer material supply levels from material storage analysis component 230, input associated with a structure and/or strength of a printed object from structure and strength analysis component 240, and a set of printing instructions from printing instructions component 250. Based on these inputs, drone coordination component 260 determines a set of simultaneous flight and printing instructions for a plurality of drones configured to print and at least one observer drone. Drone coordination component 260 may furthermore create a set of program instructions for a plurality of drones for carrying out these simultaneous flight and printing instructions. For example, drone coordination component 260 may determine and program a set of flight paths for each drone, a set of times to initiate new drones, a set of times to recall exhausted drones, a set of printing missions for each drone, and so forth.

Printing control tool 202 may further comprise program component 270. Program component 270 may receive a set of flight instructions for a plurality of drones configured to print and optionally for at least one observer drone from drone coordination component 260 and/or a set of printing instructions for a plurality of drones from at least one of drone coordination component 260 or printing instructions component 250. Program component 270 may write, package, or arrange, etc., the sets of flight instructions and printing instructions for the plurality of drones and the observer drones. In one embodiment, flight instructions and printing instructions may comprise a set of specifications. More specifically, the set of specifications may comprise a description of a 3D object (e.g., dimensions, orientation, density, composition, etc.) to be printed. This description may be translated into the sets of flight and printing instructions by drone coordination component 260 or program component 270 by determining a portion of the 3D object in the specification, determining a printing routine to construct that portion of the 3D object, and generating a printing mission entailing a set of flight and printing instructions for carrying out that printing routine to construct the portion of the 3D object described in the set of specifications.

Furthermore, program component 270 may organize a set of program instructions for each drone. Program component 270 may furthermore transmit or cause to be transmitted the program instructions for each drone to the plurality of drones having printing capability and the observer drone. For example, a particular drone may receive a transmitted package of flight and printing instructions for that particular drone enabling that particular drone to carry out a particular flying and printing mission.

It can be appreciated that the approaches disclosed herein can be used within any computer system for forming a 3D object, as shown in FIG. 1. In this case, printing control tool 202 can be provided, and one or more computerized systems for performing the processes described in embodiments of the invention can be obtained and deployed to computer system 12. To this extent, the deployment can comprise one or more of: (1) installing program code on a computing device, such as a computer system, from a computer-readable medium; (2) adding one or more computing devices to the infrastructure; and (3) incorporating and/or modifying one or more existing systems of the computer system to enable the computer system to perform the process actions of embodiments of the invention. In some embodiments, printing control tool 202 can be provided as a program modules 42 stored in memory 28 (FIG. 1). Any of energy level 210 of one or more drones, printer material supply 212 of one or more drones, structure and strength readings 214 of an object being printed from one or more observer drones, and staging data 216 may be stored in storage system 34, also stored in memory 28.

In some embodiments, it may be desirable to deploy printing control tool 202 locally to prevent time delays between a request by a user and a system response. However, embodiments of the present invention may also be deployed, for example, as a cloud-based predictive service or as any intermediary type of system.

Figure 3:
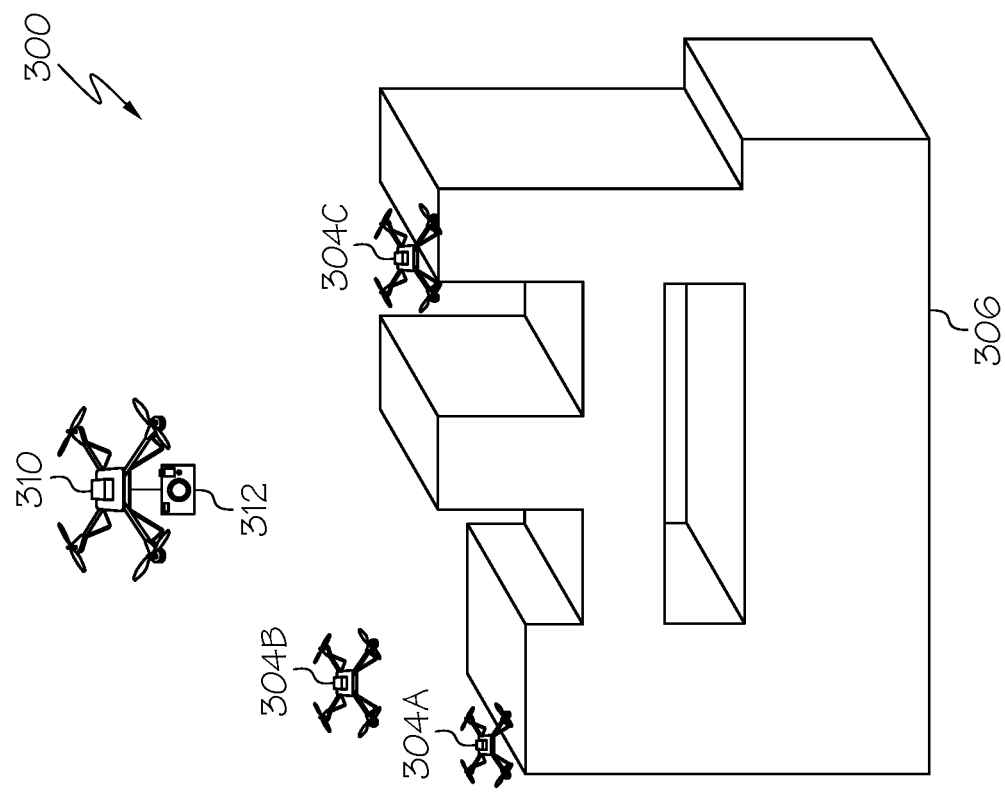
FIG. 3 shows system components according to illustrative embodiments.
Figure 3:
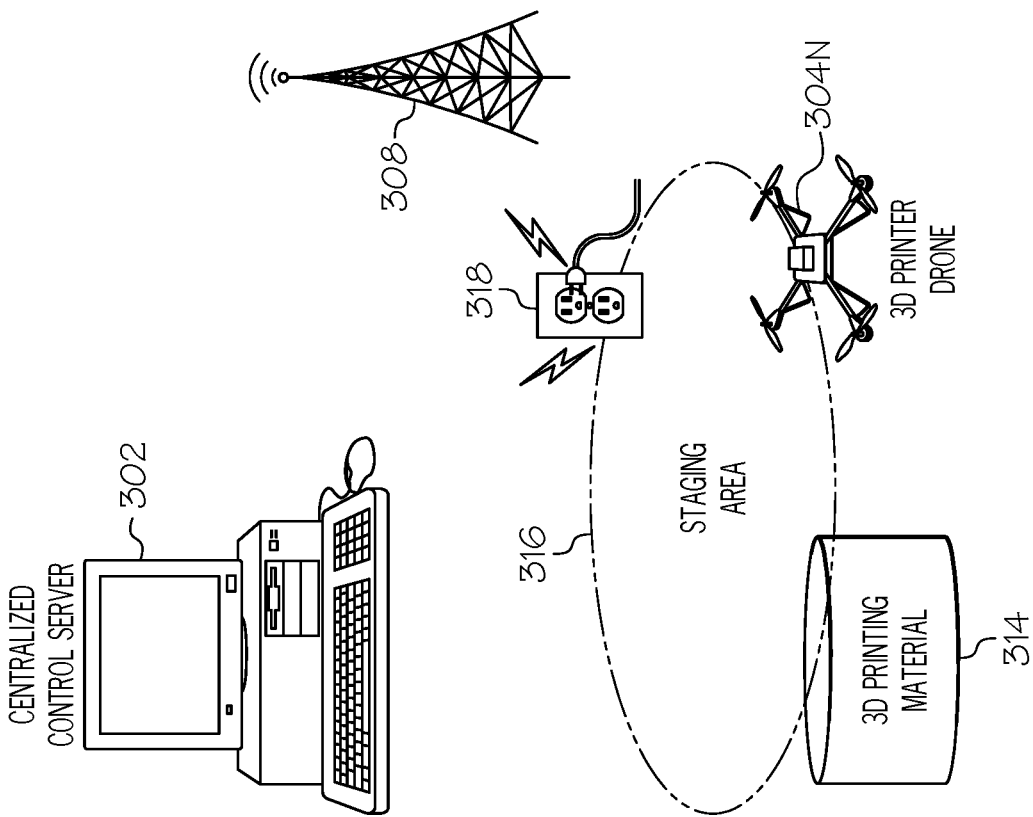

Referring now to FIG. 3, system components of control system 300 are shown according to illustrative embodiments. In one embodiment, centralized programmable control system 300 comprises central controller 302. Central controller 302 may be any server or computerized system. Central controller 302 may comprise printing control tool 202 and may be embodied in computer system 12 or any computerized device. In any case, central controller 302 is configured to program and coordinate each of a plurality of drones 304A-N having 3D printer capability (hereinafter drones 304A-N) to carry 3D printing material 314, to fly to depositing location (e.g., fly, hover, and/or land), and deposit 3D printing material 314 at the depositing location in coordination to print 3D printed object 306. This allows central controller 302 to control the activities of a first drone (e.g., flying, hovering, printing), while simultaneously controlling the activities of a second drone (e.g., flying, hovering, printing). In some embodiments, central controller 302 monitors plurality of drones 304A-N and initiates a replacement drone when one of plurality of drones 304A-N reaches a low threshold of 3D printing material 314, reaches a low energy/power threshold, or otherwise experiences technical difficulty (e.g., an unexpected malfunction or breakdown). Central controller 302 and plurality of drones 304A-N may communicate on any network 308, such as 3G, 4G, or Wi-Fi.

In another embodiment, centralized programmable control system 300 may further comprise at least one observer drone 310 having at least one camera 312. In some embodiments, observer drone 310 may be one of drones 304 having printer capabilities, and in other embodiments, observer drone 310 may be a separate drone specifically configured for observation. Camera 312 may comprise any optical sensor now known or later discovered, such as a digital camera, a digital video camera, etc. Observer drone 310 may be configured to optically view 3D printed object 306 and/or plurality of drones 304A-N via camera 312. In some embodiments, observer drone 310 may hover or circle above 3D printed object 306 at a distance/range of several feet (e.g., about 5-50 feet) or any distance sufficient to view and monitor a portion or a whole of 3D printed object 306. Observer drone 310 may be further configured to record structural, progress, and/or strength readings of 3D printed object 306 via camera 312 and/or one or more other sensors residing on observer drone 310 (e.g., a stress gauge, a strain gauge, a tensile gauge, a laser, etc.). Observer drone 310 may maneuver close to or land on a portion of 3D printed object 306 to determine the one or more structural and/or strength readings. Observer drone 310 may relay readings to central controller 302 via network 308 in order to adjust printing of 3D printed object 306 to avoid issues with construction, alignment and/or potential structural issues such that the completed 3D printed object 306 meets the initially received specifications. A printing sequence may be adjusted in response to, for example, an unexpected drone malfunction, a building progress differing from schedule, a structural variation differing from a parameter, an object strength differing from a threshold, and so forth.

In some embodiments, central controller 302 may be embodied as observer drone 310. In alternative embodiments, central controller 302 may be dispersed across plurality of drones 304A-N in communication via network 308.

In still further embodiments, centralized programmable control system 300 comprises plurality of drones 304A-N. Each of plurality of drones 304A-N comprises a base drone component which enables drones 304A-N to receive flight and mission instructions from central controller 302. Each of plurality of drones 304A-N further comprises a 3D printer component which includes a printer material storage tank or cartridge and a printing interface (e.g., a nozzle). In some embodiments, one or more of plurality of drones 304A-N may comprise a robotic arm to insert a printed 3D part. In any case, each of the plurality of drones 304A-N is configured to carry 3D printing material 314, to fly to depositing location (e.g., fly, hover, and/or land), and to deposit 3D printing material 314 upon arrival at the depositing location in coordination with other drones 304A-N to print 3D printed object 306.

In some embodiments, centralized programmable control system 300 may comprise staging area 316. Staging area 316 may be used as an operations base for plurality of drones 304A-N. For example, after a particular drone 304N has completed a programmed 3D printing task, central controller 302 may instruct the drone 304N to return to staging area 316 (e.g., to refill depleted energy levels and/or to refill a tank or printing cartridge of drone 304N with printing material 314).

In one instance, staging area 316 may be used to recharge or refuel energy levels of exhausted/depleted drones 304A-N. For example, staging area 316 may include any electrical or battery charging station 318. In another embodiment, staging area 316 may contain a refueling station (not shown). Plurality of drones 304A-N may run on any energy source now known or later discovered, such as battery, fuel cell, oil, gas, electric, solar, atomics, etc. In any case, an energy level of plurality of drones 304A-N is monitored by central controller 302 and drones with a low power or energy reading or with a completed task are recalled to staging area 316 for recharging or refueling and/or preparation for future assignments.

In another instance, staging area 316 may be used to refill printer material levels of empty drones 304A-N. For example, staging area 316 may include 3D printer material 314 reserve. 3D printer material 314 may be any liquid, powder, paper or sheet material, etc. used for 3D printing.

Moreover, printer material 314 may comprise one or more 3D printer materials now known or later discovered, such as plastics (e.g., flexible, acrylic, metallic, elastic), thermoplastics (ABS, polycarbonate, high-performance ULTEM 1010, ULTEM 9085), photopolymers, organic plastic (e.g., PLA), metals (e.g., platinum, gold, silver, brass, bronze, steel), castable wax, sand, sandstone, ceramics, etc. In any case, a printer material lever of plurality of drones 304A-N is monitored by central controller 302, and drones with a low quantity of printer material or with a completed task are recalled to staging area 316 for a material refill and/or preparation for future assignments.

Figure 4A:
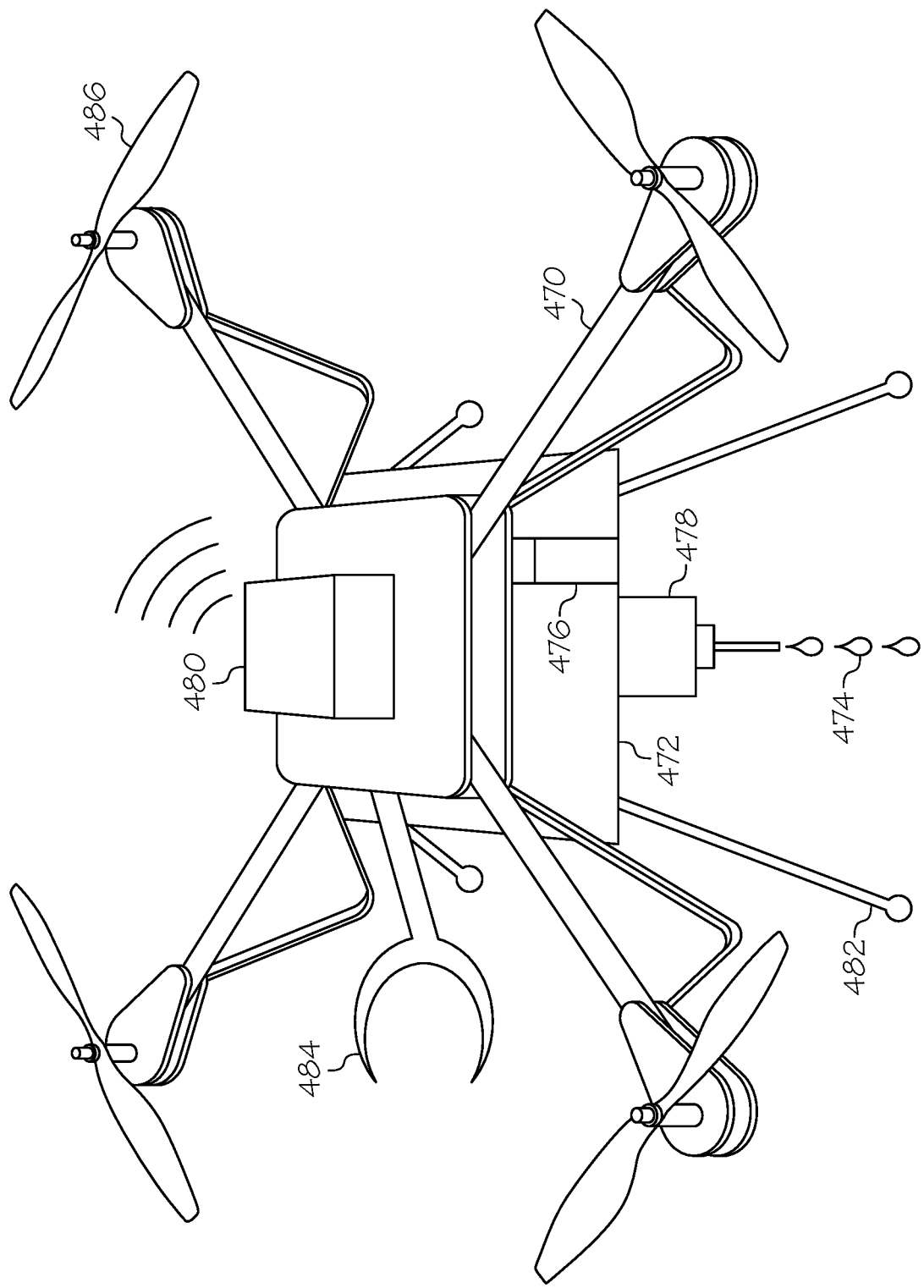
FIG. 4A shows a drone according to illustrative embodiments.

Referring now to FIG. 4A, an illustrative example of a drone having printing capability according to illustrative embodiments is shown. Drone 470 may be any unmanned aerial vehicle, also known as a "drone", now or later known. The depictions of drone 470 in FIG. 4A, as well as drones 304A-N of FIG. 3, are merely for illustrative purposes and are not intended to be limiting.

In some embodiments, drone 470 may comprise printing material storage tank 472. In some embodiments, printing material storage tank 472 may be a refillable tank configured to hold a quantity of printing material 474. Printing material storage tank 472 may comprise printing material level sensor 476 configured to register a quantity of material remaining in material storage tank 472. Drone 470 may further comprise printer material delivery apparatus 478. In some embodiments, printer material delivery apparatus 478 may be, for example, a printer nozzle, a sprayer, a hose, or any other apparatus for delivering a quantity of printer material to a surface of an object.

Drone 470 may further comprise communication interface 480. Communication interface 480 is configured to enable drone 470 to communicate with central controller 302 through network 308 (FIG. 3). Communication interface 480 is configured to send and receive signals, commands, and instructions via network 308 from central controller 302 and/or one or more other drones. Communication interface 480 is furthermore in communications with an on-board computerized processor of drone 470, which controls flying and printing activity of drone 470. Communication interface 480 relays signals, commands, and instructions from central controller 302 to the on-board computerized processor of drone 470.

In some embodiments, drone 470 may optionally be further equipped with set of landing supports 482, such as a set of legs. Set of landing supports 482 may be used by some drones to land on an object being printed. In some embodiments, set of landing supports 482 may be extendable. In some embodiments, drone 470 may optionally be further equipped with one or more tools 484, such as an arm. Tool 484 may be used by some drones for lifting and inserting a printed part into a printed object.

In some embodiments, drone 470 may be further equipped with one or more propulsion apparatuses 486, such as propellers, wings, engines, and any other propulsion apparatuses now known or later discovered. Drone 470 may also be equipped with additional hardware characteristic of a drone. For example, drone 470 may be equipped with a GPS or optical sensor other navigational sensor for determining a current location of drone 470. This navigational sensor may be used by drone 470 to position drone 470 at a location where 3D printer material is to be deposited according to a specification or to move drone 470 according to a specification.

Figure 4B:
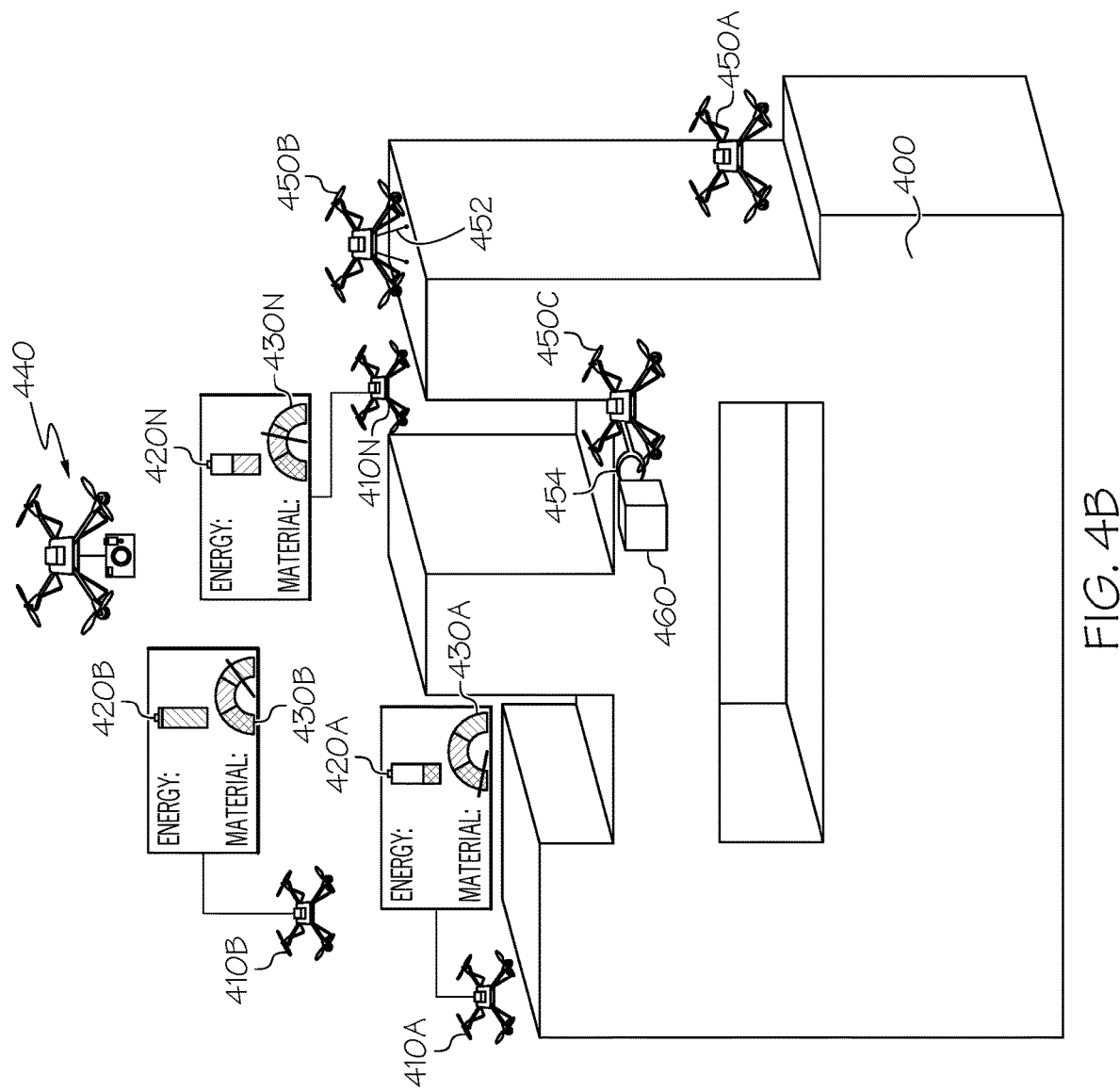
FIG. 4B shows a 3D object being printed by a plurality of drones according to illustrative embodiments.

Referring now to FIG. 4B, an illustrative example of a 3D object being printed by a plurality of drones having printing capability according to illustrative embodiments is shown. In this example, 3D object 400 is being printed by drone 410A and drone 410N in a coordinated fashion. Activity of drones 104A and 104N is coordinated from a central controller (e.g., central controller 302 of FIG. 3), which may be embodied in observer drone 440 or as a separate computer device (e.g., computer system 12 of FIG. 1). Within this example, a printing material low threshold in storage tank 430A of drone 410A has been reached. Likewise, drone 410A has also reached an energy/power low threshold of energy level 420A. Accordingly, central controller 302 (not shown) deploys drone 410B, having filled storage tank 430B and full energy/power 420B to a printing depositing location of drone 410A to replace empty and exhausted drone 410A. In one embodiment, central controller 302 detects that drone 410A is nearing a threshold and deploys drone 410B such that drone 410B arrives to relieve drone 410A in advance or just as drone 410A runs out of printer material, allowing for a seamless handoff without loss of production time. Meanwhile, as drone 410B is traveling to the location of drone 410A to relieve drone 410A, drone 410N is depositing a layer of printer material at another location on 3D object 400. Drone 410N is instructed by controller 302 to deposit a layer of printing material in response to controller 302 receiving an indication that drone 410N is at a location where printer material is to be deposited. Drone 410N, shown in FIG. 4B having an energy/power level 420N above threshold and storage tank 430A above threshold, will continue to print its task programmed by controller 302 until at least one threshold is reached. In some embodiments, central controller 302 may coordinate drone 410A-N such that drone 410A is finishing a printing task while drone 410B is simultaneously flying in to replace drone 410A, all while drone 410N is simultaneously printing its own printing task.

In another example referring to FIG. 4B, maneuvers of drones 450A-C are shown. Drones 450A-C may be configured to fly to depositing location (e.g., fly, hover, or land) and in some embodiments may be operable to insert 3D printed part 460 into large 3D object 400. For example, drone 450A is shown in FIG. 4B hovering just above a surface of existing 3D object 400 for continuous printing. In this approach, printer material that can be laid down, such as injected plastics, may be applied to a surface by drone 450A in thin layers while drone 450A hovers over that surface. In another example, drone 450B is shown in FIG. 4B landing on 3D object 400 and raising itself as a structure of 3D object 400 is printed. Drone 450B comprises legs or stilts 452 on which to land and balance. In this approach, drone 450B lands on a structure that can support drone 450B. This may provide for a more stable 3D printing than the hover approach because drone 450B is stationary. In yet another example, drone 450C is shown in FIG. 4B flying while carrying 3D printed part 460 to insert into 3D object 400. In some embodiments, drone 450C may comprise a lifting tool and/or an inserting tool (e.g., robotic arm 454, to insert 3D printed part 460 into 3D object 400). In some embodiments, drone 450C may print 3D printed part 460 itself or may pick up 3D printed part 460 from another 3D printer.

Figure 5:
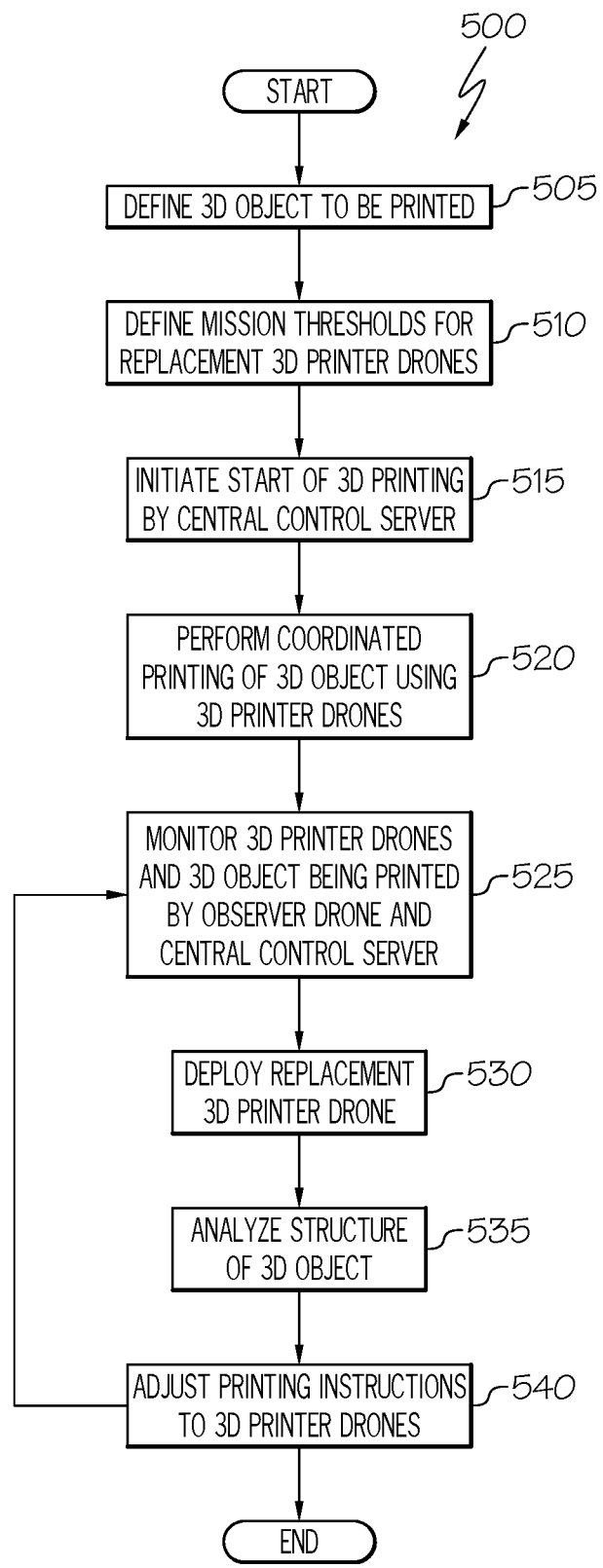
FIG. 5 shows an implementation of a 3D printing process according to illustrative embodiments.

Referring now to FIG. 5, with references to FIG. 3, an implementation of a 3D printing process 500 according to illustrative embodiments is shown. At step 505, a 3D object 306 to be printed, is defined, determined, and/or selected. For example, central controller 302 of FIG. 3 may select a 3D model corresponding to 3D object 306. The 3D model may consist, for example, of a virtual design for 3D object 306, the virtual design being embodied in a set of printing instructions, for example. In another embodiment, 3D object to be printed may be defined by a set of specifications. Central controller 302 may furthermore determine a number of drones 304A-N needed to print the selected 3D object, as well as other project specifications such as the shape and coordinates of the final 3D object to be printed in 3D space. As printing material 314 is layered to form object 306, central controller 302 may track final coordinates object relative to printing progress and, for example, identify a drone to send to a point where printing is needed.

At step 510, a set of mission thresholds are defined for deploying replacement drones. For example, a minimum energy/power supply level may be set for one or more drones (e.g., based on weight of drone and printer material, task, and travel distance) and a minimum printer material supply level may be set for one or more drones (e.g., based on replacement time). When a drone reaches one or both of these minimums, central controller 302 recalls the drone and deploys a replacement drone. Central controller 302 may calculate deployment and recall sequences based on a number of factors, such as a weight of printer material to be carried for a given 3D printing task for each drone in a given sequence, and a travel time for a replacement drone from a staging area.

Central controller 302 initiates a 3D printing at step 515. In one embodiment, central controller 302 identifies a first plurality of drones to deploy to begin printing object 306 in coordination. For example, central controller 302 may initiate drones 304A-N to take off from staging area 316 and fly to a printing location to print 3D object or structure 306. At step 520, coordinated and simultaneous printing of 3D object 306 by drones 304A-N is performed or continued. Drones 304A-N may carry out a printing job using one or more techniques such as in air 3D printing (with an optional insertion of a 3D printed part), continuous 3D printing while hovering, and/or landing on 3D object 306, and raising as a structure is printed.

As plurality of drones 304A-N print object 306, at step 525 plurality of drones 304A-N and 3D object 306 being printed are monitored by observer drone 310 and central controller 302. This monitoring may include checking, monitoring, or otherwise receiving a reading indicating a printer material level in a storage tank of and an energy/power level of each of plurality of drones 304A-N. Plurality of drones 304A-N may each comprise one or more sensors for monitoring and relaying each of a material and an energy level to central controller 302. This monitoring may also include checking a structure, strength, or progress of object 306 (e.g., via digital images recorded by camera 312 of observer drone 310). In any case, as a result of the monitoring, at step 530, central controller 302 may deploy a replacement drone when one or both of the material and the energy level near or reach a minimum threshold.

Furthermore, at step 535 the monitored structure of 3D object 30 is analyzed. This analysis may be used to determine if a structure, strength, or progress of object 306 meets a parameter of an expected structure of object 306. For example, central controller 302 may determine that object 306 is defective in some way (e.g., shape, strength, etc.). For instance, a comparison of images taken by camera 312 of observer drone 310 may show differences between a current state of object 306 and a desired programmed state or end state of object 306. The monitoring may also monitor drone behavior to determine, for example, that one or more of drones 304A-N have experienced technical difficulties or are otherwise unable to perform. In any case, in response to the structural monitoring and/or drone behavior monitoring, at step 540 central controller 302 optionally adjusts printing instructions to one or more of plurality of drones 304A-N. This may include, in one instance, deploying additional drones to replace malfunctioning ones. This may also include, in another instance, rearranging a printing sequence to avoid issues with construction or potential structural issues.

Central controller 302 may continue to monitor drones 304A-N and 3D object 306 being printed as in step 525, deploy replacement drones as in step 530, and so forth, until a printing task is completed. Once a printing task is completed, all drones 304A-N may be returned to staging area 316, for example, pending further instructions.

Figure 6:
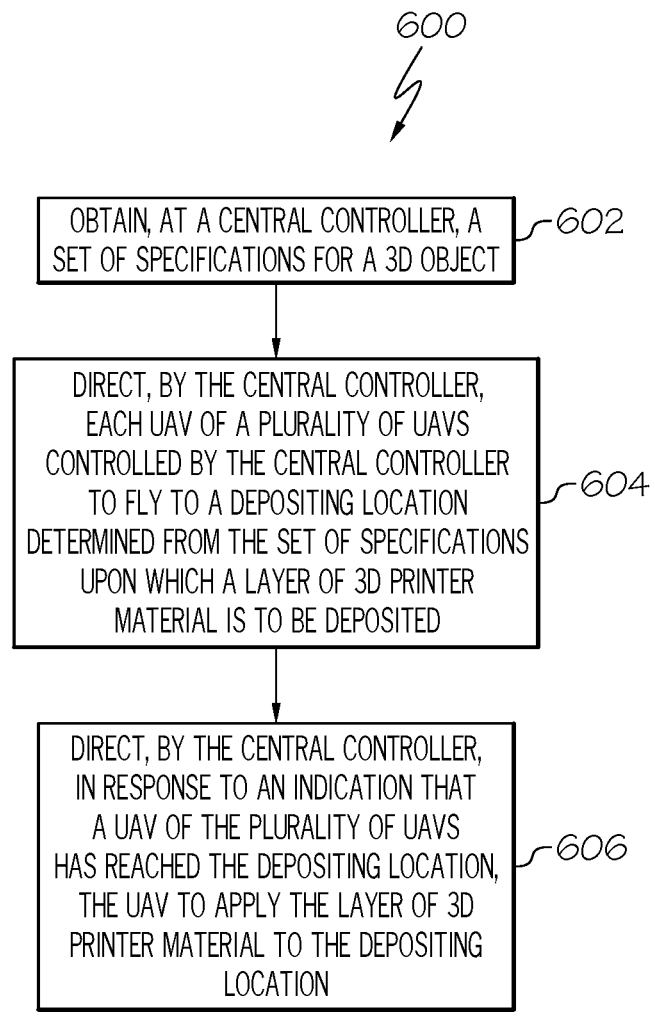
FIG. 6 shows a process flowchart for forming a 3D object according to illustrative embodiments.

As depicted in FIG. 6, in another embodiment, a system (e.g., computer system 12) carries out the methodologies disclosed herein. Shown is a process flowchart 600 for forming a 3D object. At step 602, a set of specifications for the 3D object is obtained at a central controller. At step 604, each drone or unmanned aerial vehicle (UAV) of a plurality of UAVs controlled by the central controller is directed, by the central controller, to fly to a depositing location determined from the set of specifications upon which a layer of 3D printer material is to be deposited. At step 606, the UAV is directed, by the central controller, to apply the layer of 3D printer material to the depositing location, in response to an indication that a UAV of the plurality of UAVs has reached the depositing location.

Figure 7:
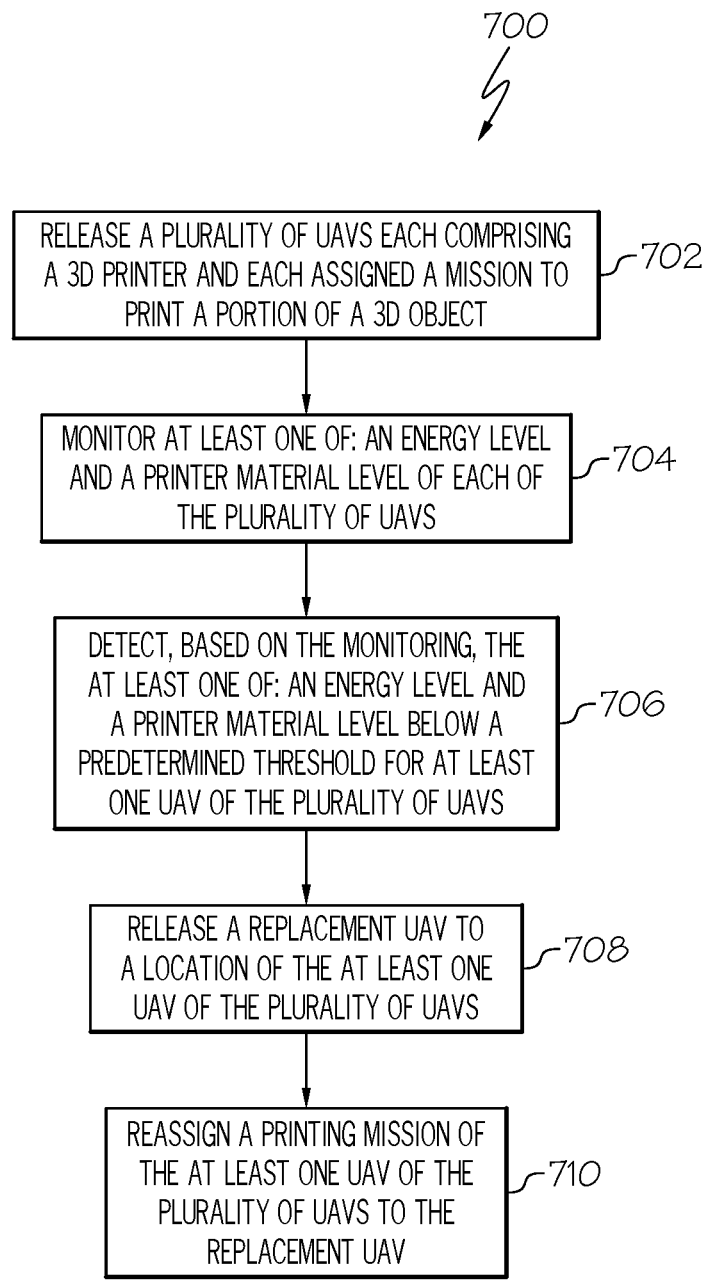
FIG. 7 shows another process flowchart for forming a 3D object according to illustrative embodiments.

As depicted in FIG. 7, in one embodiment, a system (e.g., computer system 12) carries out the methodologies disclosed herein. Shown is a process flowchart 700 for forming a 3D object. At step 702, a plurality of drones each comprising a 3D printer and each assigned a mission to print a portion of a 3D object simultaneously are released. At step 704, at least one of an energy level and a printer material level of each of the plurality of drones is monitored. At step 706, the at least one of an energy level and a printer material level is detected, based on the monitoring, below a predetermined threshold for at least one drone of the plurality of drones. At step 708, a replacement drone is released to a location of the at least one drone of the plurality of drones. At step 710, a printing mission of the at least one drone of the plurality of drones is reassigned to the replacement drone.

Process flowcharts 600 of FIGS. 6 and 700 of FIG. 7 illustrate the architecture, functionality, and operation of possible implementations of systems, methods, and computer program products according to various embodiments of the present invention. In this regard, each block in the flowcharts may represent a module, segment, or portion of code, which comprises one or more executable instructions for implementing the specified logical function(s). It should also be noted that, in some alternative implementations, the functions noted in the blocks might occur out of the order depicted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, program/utility 40 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Any of the components provided herein can be deployed, managed, serviced, etc., by a service provider that offers to deploy or integrate computing infrastructure with respect to a process for forming a 3D object. Thus, embodiments herein disclose a process for supporting computer infrastructure, comprising integrating, hosting, maintaining, and deploying computer-readable code into a computing system (e.g., computer system 12), wherein the code in combination with the computing system is capable of performing the functions described herein.

In another embodiment, the invention provides a method that performs the process steps of the invention on a subscription, advertising, and/or fee basis. That is, a service provider, such as a Solution Integrator, can offer to create, maintain, support, etc., a process for forming a 3D object. In this case, the service provider can create, maintain, support, etc., a computer infrastructure that performs the process steps of the invention for one or more customers. In return, the service provider can receive payment from the customer(s) under a subscription and/or fee agreement, and/or the service provider can receive payment from the sale of advertising content to one or more third parties.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may also be a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

It is apparent that there has been provided herein approaches to forming a 3D object with a plurality of drones. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A computer program product for forming a three-dimensional (3D) object, the computer program product comprising a computer readable storage device, and program instructions stored on the computer readable storage device, to:
   obtain, at a central controller, a set of specifications for the 3D object;
   direct by the central controller, each unmanned aerial vehicle (UAV) of a plurality of UAVs controlled by the central controller to fly to a depositing location determined from the set of specifications upon which a layer of 3D printer material is to be deposited;
   direct, by the central controller, in response to an indication that a UAV of the plurality of UAVs has reached the depositing location, the UAV to apply the layer of 3D printer material to the depositing location;
   monitor, by the central controller, a reserve of a resource in each of the plurality of UAVs as the UAV applies the printer material and a progress, through an observer UAV of the plurality of UAVs, of a deposition of the 3D printing material at the depositing location;
   detect, by the central controller, a defect in the progress of the deposition of the 3D printing material; and
   adjust, by the central controller, responsive to the detected defect, a deployment and recall sequence for the plurality of UAVs based on the defect and the monitored resource of the plurality of UAVs.

2. The computer program product of claim 1, the computer readable storage device further comprising instructions to:
   monitor at least one of an energy level and a printer material level of each UAV of the plurality of UAVs;
   detect, based on the monitoring, the at least one of an energy level and a printer material level below a predetermined threshold for at least one UAV of the plurality of UAVs;
   release a replacement UAV to a location of the at least one UAV of the plurality of UAVs; and
   reassign a printing mission of the at least one UAV of the plurality of UAVs to the replacement UAV.

3. The computer program product of claim 2, the computer readable storage device further comprising instructions to: calculate a release time of the replacement UAV to optimize a hand-off from the at least one UAV of the plurality of UAVs to the replacement UAV.

4. The computer program product of claim 2, wherein:
   the monitoring the energy level further comprises calculating a remaining energy life based on at least one of: an energy level, a rate of energy consumption, an energy requirement to return to a staging area, a UAV weight, and a UAV performance; and
   the monitoring the printer material level further comprises calculating a remaining printer material supply life based on at least one of: a printer material level, a rate of printer material consumption, and a performance.

5. The computer program product of claim 1, the computer readable storage device further comprising instructions to:
   calculate, by the central controller, a coordinated flight path for each UAV of the plurality of UAVs; and
   assign each UAV of the plurality of UAVs a set of printing instructions comprising the coordinated flight path.

6. The computer program product of claim 1, the computer readable storage device further comprising instructions to:
   receive an image of the 3D object from a UAV comprising an optical sensor;

determine if at least one of a structure parameter, a strength parameter, and a progress parameter of the 3D object is outside of a predetermined threshold based on the image; and modify a printing mission of a UAV of the plurality of UAVs in the case that the at least one of a structure parameter, a strength parameter, and a progress parameter of the 3D object is outside of the predetermined threshold.

7. The computer program product of claim 1, wherein each UAV of the plurality of UAVs is configured to at least one of: hover and deposit a layer of 3D printer material, land and deposit a layer of 3D printer material, and fly and insert a printed 3D part into the 3D object, and raise as depositing a layer of 3D printer material.

8. The computer program product of claim 1, the computer readable storage device further comprising instructions to cause the central controller to communicate with the plurality of drones over a network.

\* \* \* \* \*